April 19, 1949. J. R. ALMOND 2,467,517
POWER UNIT FOR HYDRAULIC BRAKES
Filed Jan. 4, 1946 3 Sheets-Sheet 1
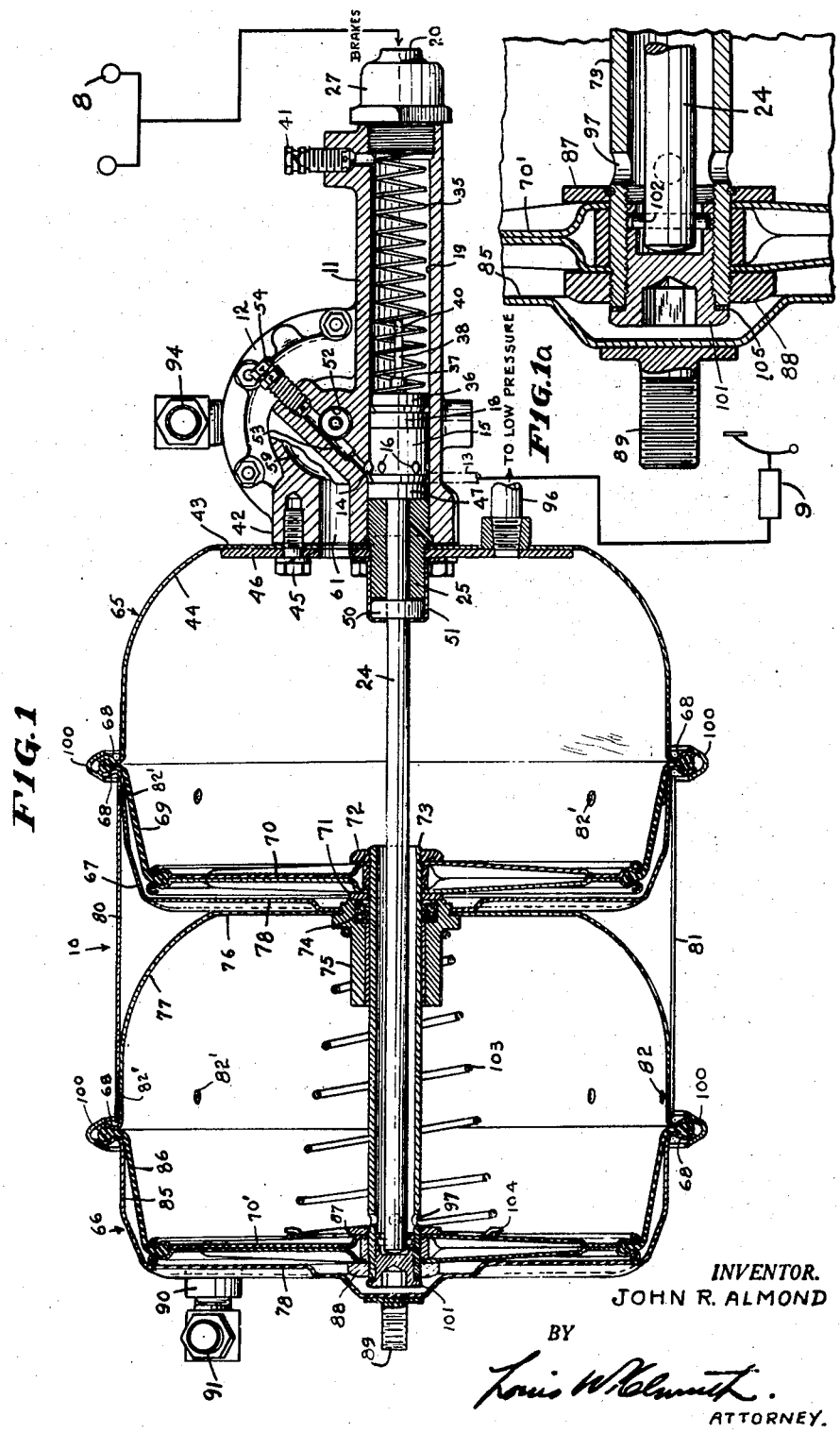
INVENTOR.
JOHN R. ALMOND
BY
ATTORNEY.

April 19, 1949. J. R. ALMOND 2,467,517
POWER UNIT FOR HYDRAULIC BRAKES
Filed Jan. 4, 1946 3 Sheets-Sheet 2
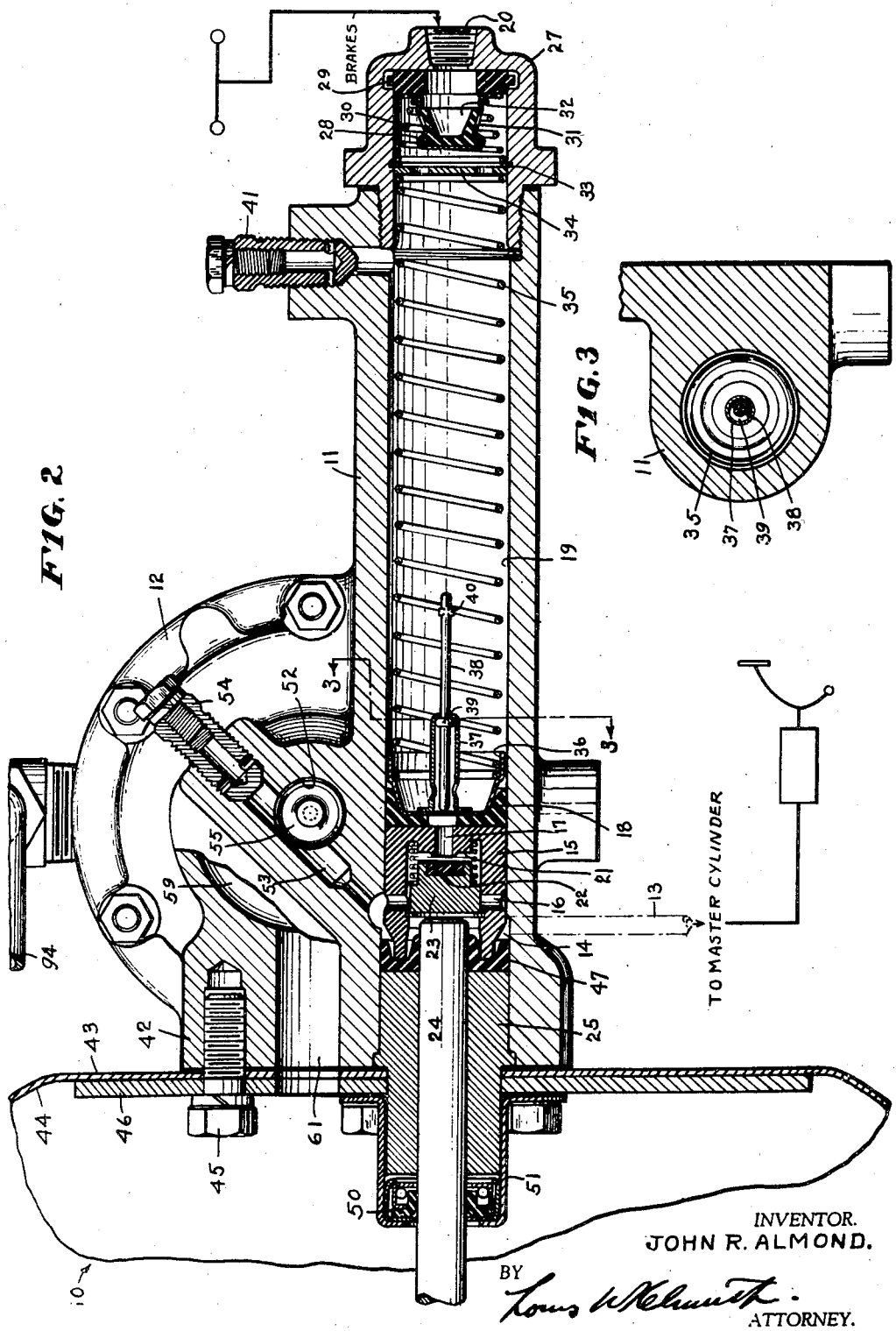
INVENTOR.
JOHN R. ALMOND.
BY
*Louis W. Klemuth*
ATTORNEY.

April 19, 1949.  J. R. ALMOND  2,467,517
POWER UNIT FOR HYDRAULIC BRAKES
Filed Jan. 4, 1946  3 Sheets-Sheet 3
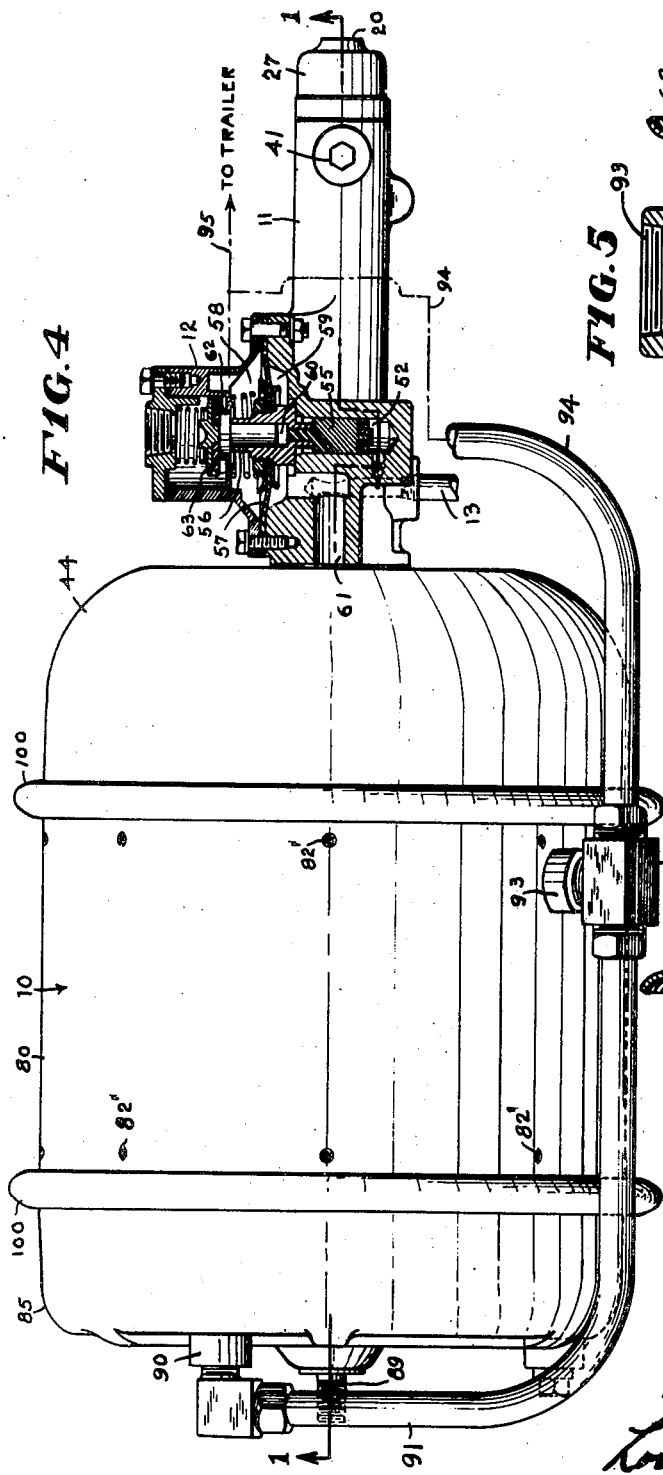
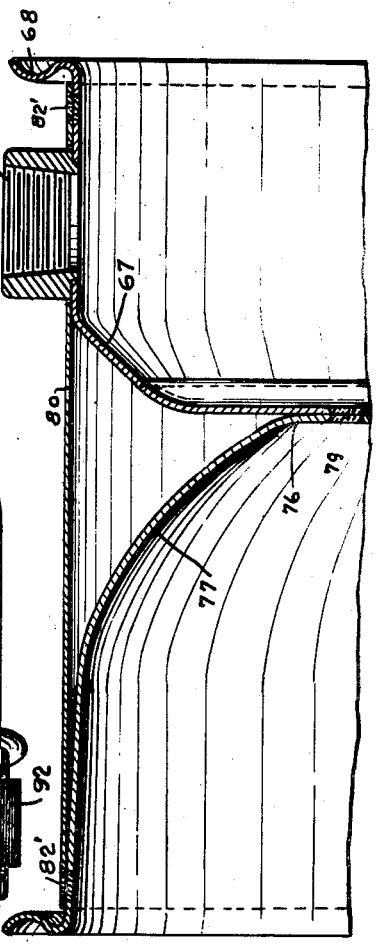
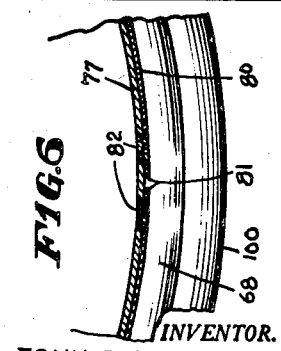
INVENTOR.
JOHN R. ALMOND.
BY
*Louis W. Mahrusk*
ATTORNEY Patented Apr. 19, 1949

2,467,517

UNITED STATES PATENT OFFICE 2,467,517

POWER UNIT FOR HYDRAULIC BRAKES

John R. Almond, Cleveland, Ohio, assignor to The Midland Steel Products Company, Cleveland, Ohio, a corporation of Ohio Application January 4, 1946, Serial No. 639,092

10 Claims. (Cl. 60—54.5)

This invention relates to new and useful improvements in power operated hydraulic pressure units for vehicle brakes and an important object is to provide means for positively and automatically unloading the pressure created by the unit under certain conditions.

Another object of the invention is to provide a differential pressure motor for operating a hydraulic unit with an elongated thrust rod which is provided with means for accurately adjusting the operating relation between the motor and the unit to achieve proper phase operation.

A further object is to provide a double capacity fluid pressure motor from two individual motors and to provide means for reinforcing the motor with an extra symmetrical casing.

A still further object of the invention is to provide the power unit with means for maintaining a pressure condition in elongated hydraulic lines or pipes, such as exists from tractor to trailer and which will assure prompt actuation of the trailer brakes from the tractor control.

Another object is to improve the construction of such brake units to increase their power and range, and to provide for sensitivity, a safety factor and to provide for quick assembly in the manufacture of the units.

Other objects and advantages will become apparent during the course of the following description.

In the accompanying drawings forming a part of the description and wherein like numerals are employed to designate like parts throughout the several views, Fig. 1 is a longitudinal vertical section through the unit taken on the line 1—1 of Fig. 4.

Fig. 1a is an enlarged view of a portion of the apparatus of Fig. 1.

Fig. 2 is an enlarged longitudinal section of the hydraulic unit,

Fig. 3 is a transverse section of the same taken on the line 3—3 of Fig. 2,

Fig. 4 is a top elevation of the power unit assembly with the hydraulically operated valve shown in section, Fig. 5 is an enlarged longitudinal section of the upper portion of the sub-assembly of the power unit or motor, Fig. 6 is an enlarged transverse section taken through part of the bottom of the power unit casing.

This invention is adapted to be used for operating the hydraulic brakes of tractor and trailer vehicles, either where the hydraulic fluid is piped from the tractor to the trailer, or where the trailer is provided either with a separate hydraulic system or is equipped with the usual air or vacuum operated brakes controlled by a fluid medium piped from the tractor to the trailer in manners well understood in the art. The power unit for such systems is shown in the accompanying drawings and consists broadly of a differential pressure motor 10 for actuating the piston of a hydraulic unit cylinder unit 11 to exercise the proper degree of pressure on the hydraulic fluid brakes of both the tractor and trailer. A differential fluid pressure control valve 12 forms an integral part of the hydraulic cylinder 11, to transmit variable degrees of fluid pressure medium to the differential motor 10, depending upon the amount of hydraulic pressure created in the cylinder 11. Actuation of this power unit is dependent upon the usual hydraulic master cylinder 9, diagrammatically shown, transmitting fluid under pressure through a pipe 13 to a compensating chamber 14 behind a piston 15 in the cylinder 11 as best seen in Fig. 2. This piston is skirted and communicates with the compensating chamber 14 through radially arranged ports 16. The piston 15 is provided with a central port 17 aligned with a central aperture of the usual skirted rubber cup 18 opening into the bore or pressure chamber 19 of the cylinder 11. Thus, a depression of the foot pedal of the master cylinder 9 places fluid in the hydraulic cylinder 11 under primary pressure transmitted to the hydraulic brake lines through the port 20 in the end of the cylinder 11 to take up slack in the brakes 8 at the wheels, and if desired, to apply these brakes with manual pressure exercised upon the master cylinder. An embossed valve seat 21 surrounds the port 17 to seat an elastic insert 22 of a valve 23 loosely slidable in the hollow piston 15. This valve 23 is normally held off of its seat by a coil spring, as shown, in order that fluid may pass from the compensating chamber 14 through the ports 16 and central port 17 of the piston. A power piston rod 24 is slidably mounted in a bushing 25 plugging the end of the cylinder 11 so that upon a power actuation of the motor 10 the rod 24 will be projected to the right of Fig. 2 to force the valve 23 upon its seat, thereby closing the port 17 and moving piston 15 to the right of Fig. 2 in order to intensify the pressure of the hydraulic medium in cylinder 11 and consequently in the brake lines 8. The extent of movement of rod 24 to the right, as viewed in Fig. 2, is limited for a purpose presently to appear.

The forward or outlet end of cylinder 11 is closed with a removable plug assembly or cap 27 having the port 20 therein to which the brake line is connected as shown in Figure 2. In this cap is located a double check valve consisting of an inwardly opening valve cage 28 held seated on an elastic collar or seat 29 by means of a coil spring 30 which holds an amount of hydraulic pressure, depending upon the strength of the spring 30, in the brake line, when piston 15 is in brake release position. Where the hydraulic brake lines back to the trailer or tractor brakes are extremely long, this double check valve 28 serves to hold the brake line pressure at a predetermined quantity so as to eliminate any tendency of the brakes to lag during a brake application. The valve cage 28 is provided with lateral ports 31 which are closed by the skirt of a rubber plug 32 seated in the cage as shown, whenever the back pressure in the brake line exceeds that existing in cylinder 11. Any pressure in the brake line exceeding the strength of spring 30, when the piston 15 is retracted or is being retracted will cause the valve cage 28 to unseat and relieve brake pressure in the brake line to a degree determined by spring 30. Of course, upon a power stroke of piston 15, the pressure of fluid will flex the skirt of valve 32 permitting fluid under pressure to pass through the ports 31 to the brake line. The spring 30 is held in the cap 27 by a snap ring 33 which also holds a perforated abutment disc 34 from movement in one direction, while a piston return spring 35 prevents movement of the disc in the opposite direction. Those parts in the cap 27 form a sub-assembly which can be removed and positioned as a unit. The opposite end of the return spring 35 seats in a metallic cup 36 in engagement with the rubber cup 18. Thus, it will be seen that piston return spring 35 has no abutment with the double check valve and therefore exercises no control over its movements. This is left entirely to the spring 30, the characteristics of which can be varied to alter the normal brake line pressure in any degree desired.

Secured over the central aperture in the metallic cup 36 and projecting axially thereof into cylinder 11 is a perforated guide sleeve 37 having its outer end flanged or spun over an unloader valve rod 38 to form a sliding fit therewith. This unloader rod is provided with an enlargement 39 which slides freely in the guide sleeve 37 to guide the unloader rod through the port 17 in piston 15 to engage and unseat the valve 23, after the piston 15 separates from the end of the rod 24 due to a liquid pressure build-up and the end of the unloader valve rod abuts the central imperforate portion of the limiting disc 34. The unloader rod is also useful in assuring the unloading of the system of hydraulic pressure when the brake lines are purged or bled with excessive pressure to advance piston 15, since the unloader rod will kick the valve 23 open whenever the piston 15 separates from the rod 24 and nears the end of its projectile stroke, thereby freeing the brake lines of any tendency toward a locked condition, since the fluid under pressure ahead of piston 15 will be relieved through the opening of the valve 23. The free end of the unloader rod 38 is pinched or upset as at 40 to prevent accidental displacement of the rod when the metallic cup 36 is being placed in or removed from the cylinder 11.

It will be understood that the extent of movement of rod 24 to the right, as viewed in Fig. 2, is so regulated that the rod cannot move piston 15 far enough to the right to cause unloader rod 40 to engage disk 34 and be moved through the piston to press against valve 23. The stroke of rod 24 is so regulated that when it has moved to its extreme right-hand position, as viewed in Fig. 2, the leading end of unloader rod 40 will preferably be just out of contact with disk 34. In no event is rod 24 capable of moving piston 15 far enough to the right, as viewed in Fig. 2, to bring rod 40 into engagement with disk 34 and force the rod into unseating engagement with valve 23.

The inner end of the hydraulic cylinder 11 is cast with an enlargement 42 to be secured to the flat end wall 43 of a convex stamping 44 forming a part of the motor 10, by means of the screw 45 clamping the flat wall between the enlarged end of the cylinder and a relatively thick steel plate 46 arranged on the inside of the stamping 44. This end wall 43 and reinforcing plate 46 have aligned openings at their centers through which a reduced portion of the bushing 25 extends with a shoulder in engagement with the end wall 43. A rubber skirted cup 47 is positioned in the compensating chamber 14 and bears against the inner end of the bushing 25 to prevent the leakage of fluid. The inner skirted end of the piston 15 is reduced to fit the groove in the rubber cup when the piston is in its retracted position as shown in Fig. 2. Inside of the hollow or skirted piston 15 is a limiting ring against which the valve 23 abuts when the valve is pushed into its fully opened position by a spring as shown. A sealing member 50 surrounds the power piston rod 24 and is held against the end of the bushing 25 inside of the motor stamping 44 by means of a stamped clip 51.

The integral enlarged portion of cylinder 11 is provided with a plunger bore 52 communicating with the compensating chamber 14 by means of a diagonal bore 53 terminating in a bleeder screw 54. A hydraulic plunger 55 for operating the control valve 12 is reciprocable in the bore 52 and terminates in a hollow hub 56 to which a diaphragm 57 is attached. Thus the valve is subjected to pressures existing in the compensating chamber. This diaphragm divides the control valve into a control chamber 58 and a low pressure chamber 59, communication between which is had through a port 60 in the hub. The low pressure chamber 59 communicates with the inside of the motor stamping 44 by means of the duct 61. The housing of the control valve is provided with a seat 62 upon which is normally engaged an air valve 63 fully disclosed in the aforesaid pending application. It will be apparent that the valve 12 is also subject to the operating pressures of the motor 10.

The motor or differential fluid pressure engine 10 for power actuating piston 15 is composed primarily of two similar power chambers 65 and 66 hooked up in tandem for increased power. Cooperating with the deeper stamping 44 is a complementary cup-shaped stamping 67, both having their open ends terminating in corresponding outwardly extending annular flanges 68 between which is clamped the outer beaded edge of a diaphragm by means of a split inverted U-shaped clamping band 100. The inner beaded edge of the diaphragm is securely clamped between the beaded edges of a pair of complementary discs 70 having complementary radially embossed portions which reinforce and space the plates apart at their hub portions to be clamped upon a collar between a snap ring 71 and a nut 72 threaded upon the end of a hollow piston stem 73. The hollow piston stem 73 is slidably mounted through a packing 74 and a bushing 75 which is suitably grooved and flanged to clamp the edges of aligned openings in the casing stamping 67 and a flat wall 76 of a second convex stamping 77 forming part of the second tandem power chamber. The end wall of the stamping 67 is more or less flat and is provided with radial reinforcing ribs 78 as best seen in Fig. 1. As shown in Fig. 5, the walls of the two stampings 77 and 67 are spot welded together as at 79 to form a sub-assembly and this is accomplished by bending a flat sheet of metal 80 into the form of a cylinder to snugly fit around both stampings 67 and 77 to reinforce them and provide a symmetrical unit. The longitudinal edges 81 of this strip of metal are drawn around the stampings as shown so that their edges are spaced apart as at 81 in Fig. 6 and are spot welded at intervals to the stampings as at 82 in order that any condensation between the stampings will drain out. In addition, the end edges of the strip 80 are spot welded at spaced intervals as at 82' to the two stampings 67 and 70 thereby forming the sub-assembly complete as a unit.

A shallow cup-shaped stamping 85 similar to the stamping 67 cooperates with the convex stamping 77 in forming the second power chamber and these two stampings are similarly clamped upon the outer beaded edge of a second diaphragm 86. The inner beaded edge of the diaphragm is clamped between a pair of piston plates 70' similar to 70, and these are secured to the opposite end of the hollow piston stem 73 by means of the snap ring 87 and nut 88. The two pistons or diaphragms 70 and 71 with the piston stem 73 are normally held in the release position shown in Fig. 1 by a coiled spring 103 abutting the bushing 75 at one end being held at its other end against the piston 70 by a disc having an offset edge 104. The stamping 85 is formed with a threaded stud 89 by which the power unit is secured to the chassis of the tractor and is also formed with a pipe connection 90 to which an L-shaped pipe connection 91 is connected thereto and to a T coupling 92 threaded into a nipple 93 secured to the power chamber stamping 67 extending through an aperture in the cylinder 80 as shown in Fig. 5. In order to connect the control valve with the T coupling 92, a pipe 94 extends therebetween as shown in Fig. 4, and if desired, an extension pipe 95 may be connected to this pipe to run to the controls on the trailer in case the trailer installation is equipped with hydraulic or vacuum brakes, whichever may be employed, and controlled in the latter case with the usual trailer relay valve. A source of low pressure such as vacuum from the intake manifold of the tractor is piped by means of conduit 96 through the motor stamping 44 in order to pass through the hollow piston stem 73 and thence out through apertures 97 into the second chamber 85. This low pressure is also simultaneously communicated through the port 61 to the low pressure chamber 59 of the valve and thence through the hollow hub 56 to control chamber 58, from whence it passes through pipes 94 and 91 into the chambers at the left side of the diaphragms to suspend the power unit or motor in vacuum, so that the various parts in brake release position assume the position shown in Figs. 1 and 2.

In order to achieve proper phase operation between the motor 10 and the hydraulic piston 15, an adjustable plug 101 is screwed into the end of the power piston stem 73 for abutment with the rearmost end of the piston rod 24. A key pin 102 is passed through the rod and stem 73 to maintain the relationship irrespective of the direction of adjustment of this plug. By adding or subtracting shims 105 between the end of stem 73 and the flange of plug 101 the distance between the end of piston rod 24 and the hydraulic valve 23 can be altered so that this valve can be closed and pressure in the cylinder 15 can be initiated at any desired interval of time subsequent to the initiation of movement of the diaphragm 69 and 86.

From the foregoing description it will be apparent that when the brake pedal of the master cylinder 9 on the tractor is depressed, its initial movement will force liquid into the compensating chamber 14 through the piston 15, check valve 28 and into the brake lines to take up whatever slack exists and to press the brake shoes to the drums. As hydraulic pressure in the compensating chamber 14 increases, it is transmitted to the valve plunger 55 to cause the hub of the valve to open the air inlet valve 63 whereby air at atmospheric pressure is admitted to the control chamber 58 and passes to the left hand sides of the diaphragms in the motor to move them to the right of Fig. 1. This motion is transmitted through the piston rod 24 to effect closing of the hydraulic valve 23 and to compel forward movement of the hydraulic piston 15 thereby increasing hydraulic pressure in the cylinder 15 and hydraulic lines to the brakes. Due to hydraulic pressures on both sides of piston 15, the valve 12 will be impressed at all times with the power input and power output of the device thereby rendering the diaphragm sensitive to those pressures and the power unit highly accurate in its control of the brakes. It will also be apparent that as piston 15 approaches the limit of projectile movement from hydraulic pressure, the unloader valve rod 38 will strike the abutment disc 34 to unseat the hydraulic valve 23 and release pressure forward of the piston 15 without damaging or interfering with the operation of the double check valve 28. Upon release of pedal pressure the valve cage 28 and the valve 23 will also be opened by back pressure of fluid in the brake lines, to release the brakes and permit compensation.

From the unitized sectional arrangement of the differential pressure motor 10, it will be obvious that in cases where such high pressures are not required, a single power unit composed of merely the stampings 77 and 85 can be substituted for the dual units by simply securing the one unit to the enlarged end of the hydraulic cylinder 11 and shortening the piston rod and piping accordingly. From this, arises the manufacturing advantage of the parts being interchangeable for dual or single motors, each of which can be readily assembled into a complete unit from parts carried in stock.

Of course it will be apparent that various changes in the arrangement of parts may be resorted to without departing from the spirit of the invention and the scope of the appended claims.

I claim:

1. A hydraulic cylinder for hydraulic brakes, a piston therefor having a fluid port, a valve behind said piston and cooperating with said port to trap fluid ahead of the piston, said cylinder having an inlet for fluid under pressure behind said valve, an axially movable rod engageable with said valve for moving the valve against said piston to close said port and to move the piston forward in the cylinder, and means carried by said piston and movable through said port and relative to said valve to engage and open said valve when the piston has been moved away from said rod under the influence of fluid under pressure behind said valve and is near to the limit of its forward movement.

2. A device for use with hydraulic brakes comprising a hydraulic cylinder having an abutment, a piston in the cylinder and having a fluid port, a perforated sleeve projecting forward from the piston in alignment with said port, a normally open valve on the rearward side of said piston for closing said port when the piston is moved forwardly in the cylinder to apply brakes and an unloader rod slidable in said sleeve relative to said valve to move rearwardly in said port and engage and open said valve when said piston nears the limit of its forward movement and the forward end of the rod engages said abutment.

3. A hydraulic cylinder for hydraulic brakes having an outlet with a two-way check valve positioned therein, a piston in said cylinder with a fluid port, a rubber cup for said piston with a hole aligned with said port, a metallic cup forming a seat for a spring seated on said rubber cup, a perforated sleeve secured to said metallic cup and extending axially thereof, a valve cooperating with said port to trap fluid ahead of said piston, a ported partition in the forward outlet end of said cylinder, a piston return spring on one side of said partition, a valve spring on the other side of said partition for said two-way check valve, and an unloader rod slidable in said sleeve to engage and open said piston valve when said piston moves said rod into engagement with said partition.

4. The combination with a fluid medium differential pressure power chamber having a fluid piston and a piston rod, a hydraulic cylinder secured to one end of said cylinder and having a hydraulic piston therein with a fluid port, a valve cooperating with said port to trap fluid ahead of said hydraulic piston, and means for adjustably connecting said piston rod to said fluid piston to alter its relationship with said valve.

5. The combination with a pair of power chambers for power brakes, each having a piston therein, a hollow piston rod connecting said pistons and having a plug adjustable lengthwise therein, a hydraulic cylinder secured to one of said chambers and having a hydraulic piston therein with a fluid port, a valve cooperating with said port to trap fluid ahead of said hydraulic piston, and a solid piston rod extending through said hollow piston rod with one end in cooperative relation to said valve and its other end engaging said adjustable plug.

6. Brake operating means comprising a master cylinder having a foot pedal, a differential fluid pressure power engine having a piston and piston rod, a hydraulic cylinder secured to said engine and having a hydraulic piston therein with a fluid port, a pipe line connecting the master cylinder to the hydraulic cylinder at the rear of said hydraulic piston, means cooperating with said port to trap liquid ahead of said piston upon a projectile stroke thereof and to open said port upon retractile stroke of said hydraulic piston, said hydraulic piston being moved in a projectile stroke either by said differential piston rod or by "pumping" or "fanning" said foot pedal to create hydraulic pressure behind said hydraulic piston, and unloading means adapted to equalize pressures on opposite sides of said piston, when said hydraulic piston separates from the end of said differential piston rod upon extended projectile stroke of said hydraulic piston.

7. Brake operating means comprising a master cylinder having a foot pedal, a differential fluid pressure power engine having a piston and piston rod, a hydraulic cylinder secured to said engine and having the hydraulic piston therein with a liquid port, a pipe line connecting the master cylinder to the hydraulic cylinder at the rear of said hydraulic piston, a valve cooperating with said port to trap liquid ahead of said piston upon a projectile stroke thereof and to open said port upon retractile stroke of said hydraulic piston, said hydraulic piston being moved in a projectile stroke either by differential fluid pressure operating said piston rod or by "pumping" or "fanning" said foot pedal to create hydraulic pressure behind said hydraulic piston, and unloader rod in said hydraulic cylinder adapted to engage and unseat said valve when said hydraulic piston is moved away from the end of said differential piston rod upon increase of hydraulic pressure behind said hydraulic piston.

8. Brake operating means comprising a master cylinder having a foot pedal, a differential fluid pressure power engine having a piston and piston rod, a hydraulic cylinder secured to said engine and having a hydraulic piston therein with a liquid port, a pipe line connecting the master cylinder to the hydraulic cylinder at the rear of said hydraulic piston, a valve cooperating with said port to trap liquid ahead of said hydraulic piston upon a projectile stroke thereof and to open said port upon retractile stroke of said hydraulic piston, said hydraulic piston being moved in a projectile stroke either by said differential piston rod or by "pumping" or "fanning" said foot pedal to create hydraulic pressure behind said hydraulic piston, and an unloader rod slidably mounted on said hydraulic piston and adapted to engage a part of said hydraulic cylinder to be moved relatively to engage and unseat said valve when said hydraulic piston is moved by hydraulic pressure away from the end of said differential piston rod upon increase of hydraulic pressure behind said hydraulic piston.

9. The combination with a master cylinder having foot pedal, a differential and fluid pressure power engine having a piston and piston rod, a hydraulic cylinder secured to said engine and having a hydraulic piston therein with a fluid port, a pipe line connecting the master cylinder to the hydraulic cylinder at the rear of said hydraulic piston, a rubber cup for said hydraulic piston with a hole aligned with said port, a metallic cup seated upon said rubber cup, a perforated sleeve secured to said metallic cup and extending axially thereof in alignment with said port, an unloader rod slidable in said sleeve, a valve cooperating with said port to close the same upon being projected either by an increase in hydraulic pressure or by projectile movement of said differential piston rod, and a ported partition in the forward outlet end of said cylinder adapted to be engaged by said unloader rod to move the latter against said valve to open the same when the hydraulic piston has been moved near the end of the projectile stroke and away from said differential piston rod by a build-up of hydraulic pressure behind said hydraulic piston.

10. The combination with a differential pressure power engine having a fluid piston and piston rod, a hydraulic cylinder secured thereto and having a hydraulic piston therein with a fluid port, a valve cooperating with said port to trap fluid ahead of said hydraulic piston upon a projectile stroke thereof and to open said port upon retractile movement of said piston, said valve being moved independently of said piston upon fluid pressure build-up on the piston rod side of said valve to close said port and to move said piston forwardly independently of said differential piston rod, and an unloader rod in said hydraulic cylinder adapted to engage and unseat said valve upon projectile stroke of said hydraulic piston induced by a hydraulic pressure build-up.

JOHN R. ALMOND.

REFERENCES CITED

The following references are of record in the file of this patent:

UNITED STATES PATENTS

| Number | Name | Date |
|---|---|---|
| 697,140 | Goldschmidt | Apr. 8, 1902 |
| 2,292,916 | Wheelon | Aug. 11, 1942 |
| 2,332,340 | Price | Oct. 19, 1943 |
| 2,345,811 | Harp | Apr. 4, 1944 |
| 2,349,416 | Freeman | May 23, 1944 |
| 2,379,299 | Heintz | June 26, 1945 |

FOREIGN PATENTS

| Number | Country | Date |
|---|---|---|
| 504,278 | Great Britain | Apr. 19, 1939 |